(12) United States Patent
Yi et al.

(10) Patent No.: US 9,230,123 B2
(45) Date of Patent: Jan. 5, 2016

(54) APPARATUS FOR TAMPER PROTECTION OF APPLICATION CODE BASED ON SELF MODIFICATION AND METHOD THEREOF

(71) Applicant: SOONGSIL UNIVERSITY RESEARCH CONSORTIUM TECHNO-PARK, Seoul (KR)

(72) Inventors: Jeong Hyun Yi, Gyeonggi-do (KR); Jin Hyuk Jung, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 14/360,304

(22) PCT Filed: Sep. 30, 2013

(86) PCT No.: PCT/KR2013/008750
§ 371 (c)(1),
(2) Date: May 23, 2014

(87) PCT Pub. No.: WO2015/046655
PCT Pub. Date: Apr. 2, 2015

(65) Prior Publication Data
US 2015/0154407 A1 Jun. 4, 2015

(30) Foreign Application Priority Data
Sep. 27, 2013 (KR) .......................... 10-2013-0115309

(51) Int. Cl.
| G06F 11/30 | (2006.01) |
| G06F 21/60 | (2013.01) |
| G06F 21/14 | (2013.01) |
| G06F 9/45  | (2006.01) |
| G06F 21/12 | (2013.01) |

(52) U.S. Cl.
CPC ................ G06F 21/602 (2013.01); G06F 8/44 (2013.01); G06F 21/14 (2013.01); G06F 21/60 (2013.01); G06F 21/125 (2013.01)

(58) Field of Classification Search
CPC ....... G06F 21/602; G06F 21/14; G06F 21/60; G06F 21/125; G06F 8/44
See application file for complete search history.

(56) References Cited

U.S. PATENT DOCUMENTS

| 6,006,328 A * | 12/1999 | Drake ..................... G06F 21/14 |
|   |   | 713/188 |
| 7,590,863 B2 * | 9/2009 | Lambert ...................... 713/189 |

(Continued)

FOREIGN PATENT DOCUMENTS

KR 10-1234591 2/2013

OTHER PUBLICATIONS

J. Cappaert et al., "Towards Tamper Resistant Code Encryption: Practice and Experience," Information Security Practice and Experience, 4th International Conference, ISPEC 2008, Sydney, Australia, pp. 86-100.*

*Primary Examiner* — Techane Gergiso
(74) *Attorney, Agent, or Firm* — Revolution IP, PLLC (57) ABSTRACT

Disclosed is an apparatus for tamper protection of an application which includes: an input unit that receives codes to be used for an application; a code separator that separates the inputted codes into sensitive codes requiring application tamper protection and general codes including sensitive method calling routine for calling the sensitive codes by analyzing the input codes; an encoder that encrypts the sensitive codes and inserts the address of an sensitive code connector storing the address information of the sensitive codes; a controller that converts the sensitive method calling routine to be able to call dummy codes by inserting the dummy codes to the general codes, inserts vector table generator, to the sensitive codes, and insert a sensitive method calling routine converter, to the sensitive codes; and a code combiner that creates the application by combining the general codes and the sensitive codes.

10 Claims, 8 Drawing Sheets

(56) References Cited

U.S. PATENT DOCUMENTS

| | | | |
|---|---|---|---|
| 2004/0003264 A1* | 1/2004 | Zeman et al. | 713/190 |
| 2005/0193369 A1* | 9/2005 | Brumme et al. | 717/106 |
| 2007/0256061 A1* | 11/2007 | Victorov | 717/141 |
| 2013/0061222 A1* | 3/2013 | Hwang et al. | 718/1 |
| 2013/0066954 A1* | 3/2013 | Nagase | 709/203 |

* cited by examiner

| vector | sensitive code to call |
|---|---|
| $V_1$ | sensitive code A |
| $V_2$ | sensitive code C |
| $V_3$ | sensitive code B |
| ⋮ | ⋮ |

APPARATUS FOR TAMPER PROTECTION OF APPLICATION CODE BASED ON SELF MODIFICATION AND METHOD THEREOF

CROSS REFERENCE TO PRIOR APPLICATIONS

This application is a National Stage Application of PCT International Patent Application No. PCT/KR2013/008750 filed on Sep. 30, 2013, under 35 U.S.C. §371, which claims priority to Korean Patent Application No. 10-2013-0115309 filed on Sep. 27, 2013, which are all hereby incorporated by reference in their entirety.

TECHNICAL FIELD

The present invention relates to an apparatus for application code obfuscation and a method thereof, and more particularly to an apparatus for application code obfuscation based of self modification, and a method thereof.

BACKGROUND ART

The application obfuscation apparatuses and methods for Java language obfuscate applications of the related art that operate in a java virtual machine by changing the code structure of the applications. The obfuscated applications are composed of a group of commands and an object file that operate in a java virtual machine in the same way before the obfuscation.

The obfuscation apparatuses and methods in the related art, however, there is a problem in that the vulnerability to reverse engineering of the managed code that operates in a virtual machine remains even after obfuscation.

The vulnerability to reverse engineering of the managed code is as follows. Source code information such as the class name, the member variable name, and the method name is included in a complied object code and the code is explicitly structurized, such that it is easy to find or analyze a specific logic through reverse engineering.

Android applications, similar to the applications that operate in a java machine, are also composed of managed codes that operate in a dalvik virtual machine, and are stored in a DEX (dalvik executable) file type. Accordingly, the android applications are also vulnerable to reverse engineering of the managed code, similar to the java applications.

The background art of the present invention has been described in Korean Patent Registration Publication No. 10-1234591 (2013, 2, 19).

DISCLOSURE

Technical Problem

An object of the present invention is to provide an apparatus for application code obfuscation based on self modification for protecting an android application and a method of application code obfuscation.

Technical Solution

An apparatus for tamper protection of an application code according to an embodiment of the present invention includes: an input unit that receives codes to be used for an application; a code separator that separates the inputted code into sensitive codes requiring application tamper protection and general codes including sensitive method calling routine for calling the sensitive codes by analyzing the input codes; an encoder that encrypts the sensitive codes and inserts the address of a sensitive code connector storing the address information of the sensitive codes; a controller that converts the sensitive method calling routine to be able to call dummy codes by inserting the dummy codes to the general codes, inserts vector table generator for creating a vector table including vector information of the sensitive codes, to the sensitive codes, and insert a sensitive method calling routine converter, which makes the sensitive method calling routine call the sensitive codes when the application is executed, to the sensitive codes; and a code combiner that creates the application by combining the general codes and the sensitive codes.

The apparatus may further include: a first compiler that complies sensitive codes added with a sensitive code connector, a vector table generator, and a sensitive method calling routine converter under a native environment; and a second compiler that creates an execution file by compiling general codes converted so that the sensitive method calling routine calls dummy codes, under a managed environment.

The encoder may encrypt a binary code by performing a code protection scheme based of self modification on the compiled sensitive code.

The code converter may add a startup routine to be loaded with the sensitive code to the general code.

The apparatus may further include a scrambler that scrambles the sensitive codes and the general codes by replacing the sensitive identifiers defined in the codes with meaningless characters or character strings.

When a client receiving the application executes the application, using the startup routine, the general code in the format of DEX file may be converted into the format of an ODEX (Optimized DEX) file and loaded on a dalvik virtual machine (DVM).

The encrypted sensitive code connector, the vector table generator, the sensitive method calling routine converter, and the sensitive code may be decoded, the vector table generator may create the vector table, the sensitive method calling routine converter may convert the sensitive method calling routine to call the sensitive code, and when the sensitive method calling routine calls a sensitive code through a vector value in the vector table, the sensitive code connector may call and execute a sensitive code corresponding to the vector value, using the vector table and the address information of the sensitive code.

A method of tamper protection of an application, using an apparatus for tamper protection of an application according to another embodiment includes: receiving codes to be used for an application; separating the inputted code into sensitive codes requiring application tamper protection and general codes including sensitive method calling routine for calling the sensitive codes; encrypting the sensitive codes and inserting the address of a sensitive code connector storing the address information of the sensitive codes; converting the sensitive method calling routine to be able to call dummy codes by inserting the dummy codes to the general codes and inserting vector table generator for creating a vector table including vector information of the sensitive codes, to the sensitive codes; inserting a sensitive method calling routine converter, which makes the sensitive method calling routine call the sensitive codes when the application is executed, to the sensitive codes; and creating the application by combining the general codes and the sensitive codes.

Advantageous Effects

According to the present invention, since the codes of an application are separated into sensitive codes and general codes and they are encrypted under different environments, it is possible to compensate vulnerability to reverse engineering of a managed code, such that it is possible to increase security against forgery of an application.

Further, the sensitive method calling routine for calling sensitive codes is stored to call dummy codes when an application is not executed, and it is converted to actually call sensitive codes, using a self modification scheme when an application is executed, such that it prevents static and dynamic analysis by a hacker.

[Description of Main Reference Numerals of Drawings]

| | |
|---|---|
| 100: apparatus for application obfuscation | 110: input unit |
| 120: code separator | 130: code converter |
| 140: scrambler | 145: encoder |
| 150: controller | 160: code combiner |
| 170: compiler | 171: first compiler |
| 172: second compiler | |

BEST MODE

Embodiments of the present invention will be described in detail with reference to the accompanying drawings for those skilled in the art to easily achieve the present invention. However, the present invention may be achieved in various different ways and is not limited to the embodiments described herein. In the accompanying drawings, portions unrelated to the description will be omitted in order to obviously describe the present invention, and similar reference numerals will be used to describe similar portions throughout the present specification.

An apparatus for application obfuscation according to an embodiment of the present invention is described first.

Figure 1:
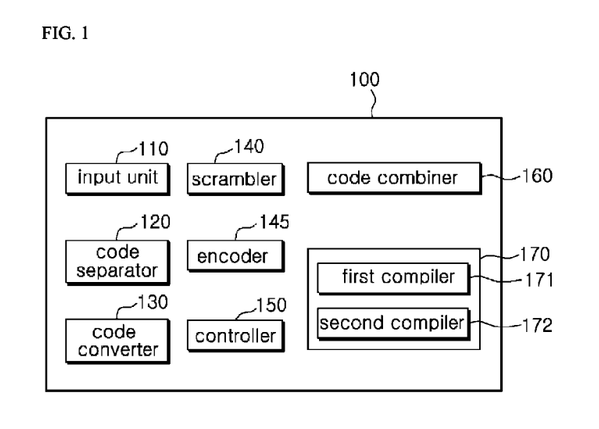
FIG. 1 is a diagram illustrating the configuration of an apparatus for application obfuscation according to an embodiment of the present invention.

FIG. 1 is a diagram illustrating an apparatus for application obfuscation according to an embodiment of the present invention.

Referring to FIG. 1, an apparatus 100 for application obfuscation includes an input unit 110, a code separator 120, a code converter 130, a scrambler 140, an encoder 145, a controller 150, and a code combiner 160, and may further include a compiler 170.

First, the input unit 110 receives the codes of an application. The inputted codes, which are codes for creating an application, may be codes in the format of a source code or a managed code.

The code separator 120 separates the codes inputted through the input unit 110 into sensitive codes requiring application tamper protection and general codes except for the sensitive codes by analyzing the input codes.

The code converter 130 converts the sensitive codes separated by the code separator 120 from a managed code into a native code.

The scrambler 140 scrambles sensitive identifiers defined in the sensitive codes and the general codes by replacing the sensitive identifiers with meaningless characters or character strings.

The encoder 145 encrypts a binary code by performing a code protection scheme based on self modification on the compiled sensitive code.

The controller 150 inserts a dummy code into a general code such that a sensitive method calling routine converts to call a dummy code. Further, it inserts a vector table generator for creating a vector table including the vector information of sensitive codes, into sensitive codes. The controller 150 inserts a sensitive method calling routine converter that makes the sensitive method calling routine call sensitive codes in execution of an application, into sensitive codes.

The code combiner 160 creates a combined file that can be distributed to clients by combining the encrypted general codes and sensitive codes. As an embodiment of the present invention, for android applications, the files with an extension of apk (Android package) are the combined files.

The compiler 170 may include a first compiler 171 operating under a native environment to compile sensitive files and a second compiler 172 operating under a managed environment to compile general codes.

The first compiler 171 compiles sensitive codes added with a sensitive code connector, a vector table generator, and a sensitive method calling routine converter in a native environment. The second compiler 172 creates an execution file by compiling general codes converted so that the sensitive method calling routine calls dummy code, in a managed environment.

A method of application obfuscation according to an embodiment of the present invention is described hereafter.

Figure 2:
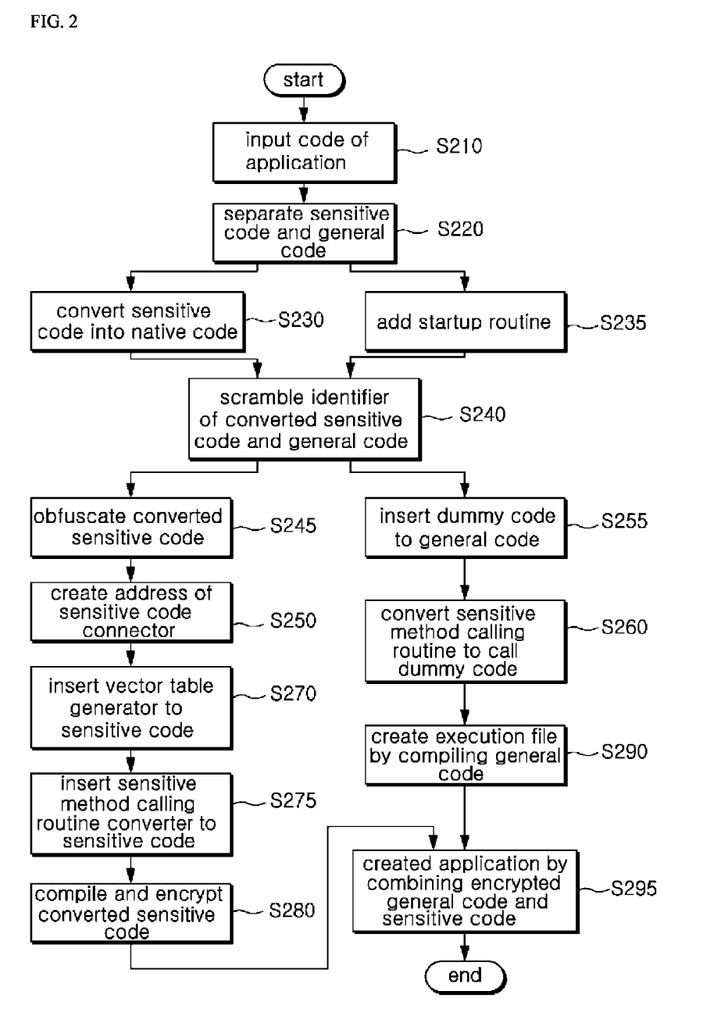
FIG. 2 is a flowchart illustrating a method of application obfuscation according to an embodiment of the present invention.

FIG. 2 is a flowchart illustrating a method of application obfuscation according to an embodiment of the present invention.

The input unit 110 receives the code of an application (S210). The input unit 110 may have an input interface, in a type of keypads. The input codes may be source codes or codes in the format of the managed code that can be executed in a JVM (Java Virtual Machine) or a DVM (Dalvik Virtual Machine).

The code separator 120 separates the codes inputted through the input unit 110 into sensitive codes requiring application tamper protection and general codes except for the sensitive codes by analyzing the input codes (S220).

The general codes include a sensitive method calling routine that can call sensitive codes or native codes converted from sensitive codes in a general code region. The sensitive codes mean the codes requiring tamper-protection against a hacker in the side of the user. The codes except for the sensitive codes are called general codes, in opposite conception to the sensitive codes. A core code may be used as a synonym of the sensitive code.

For the code classification, the code separator 120 may determine the codes matching with sensitive code models in the inputted execution codes as sensitive codes, using stored sensitive code models.

The code converter 130 converts the sensitive codes separated by the code separator 120 from a managed code into a native code (S230). That is, the code converter 130 converts sensitive codes in the format of a managed code into the formation of a native code. The native code is a code that is closer to a binary code than a managed code and executed in a CPU environment, unlike the managed code that is executed in a JVM or DVM.

As an embodiment of the present invention, the code converter 130 can convert a sensitive code into a C code. The 'sensitive code' may be used as a synonym of the native code or the C code in an embodiment of the present invention.

The sensitive code is stored in an ELF (Executable and Linkable Format) in a native code section. The code structure of the ELF is not clearly discriminated, such that it has an advantage that it is not relatively easily exposed to dynamic analysis or static analysis for code forgery in comparison to the DEX format. Further, the ELF is composed of CPU commands at a low level close to the mechanical language in comparison to Dalvik commands, such that a hacker has difficulty in dynamic analysis and static analysis.

The code converter 130 may add a startup routine to be loaded with a sensitive code to a general code (S235). As an embodiment of the present invention, the startup routine may include a JNI (Java Native Interface) function.

The scrambler 140 scrambles sensitive identifiers defined in the sensitive codes and the general codes by replacing the sensitive identifiers with meaningless characters or character strings (S240). The scramble identifier is a kind of arrangement obfuscation that makes reverse engineering difficult by changing the identifier in a code into one or more series of alphabetical letters.

Figure 3:
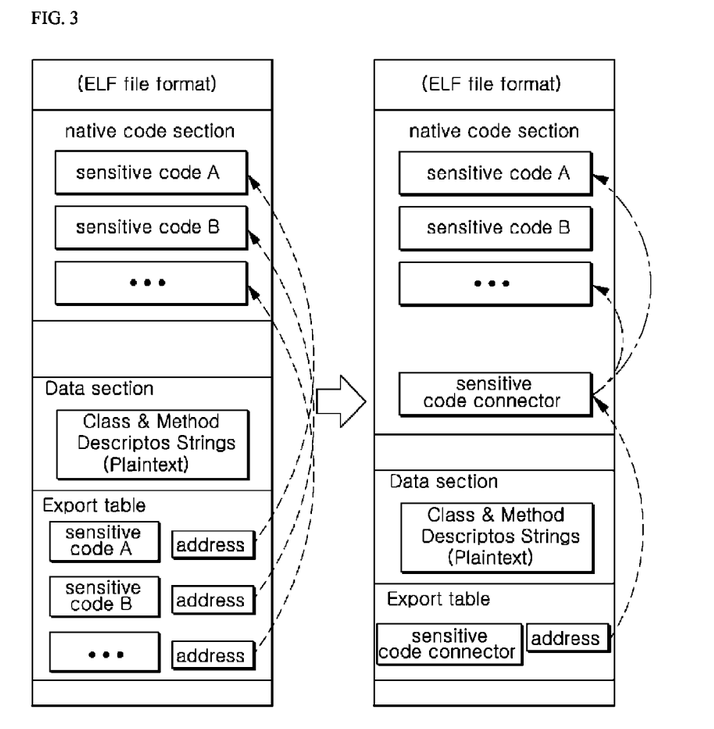
FIG. 3 is a diagram illustrating the file structure of a sensitive code according to an embodiment of the present invention.

A sensitive code that has undergone the scrambling, as in S240, has the native file structure, as in the left one in FIG. 3.

Figure 4:
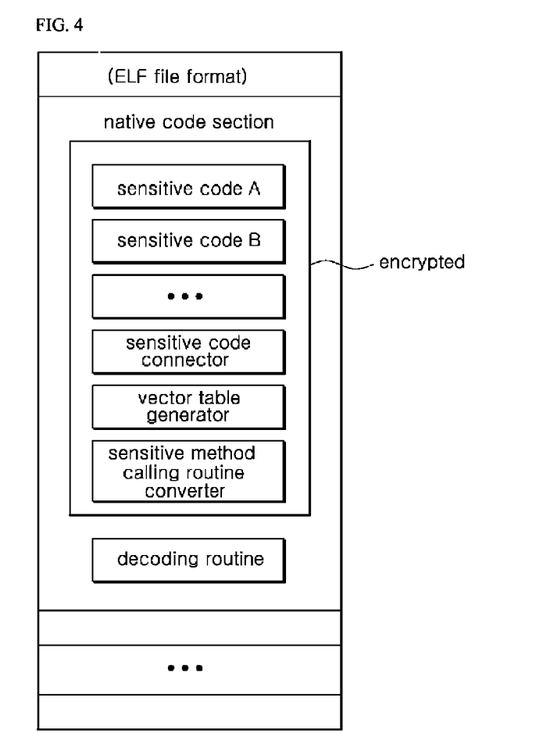
FIG. 4 is a diagram illustrating the file structure of an obfuscated sensitive code according to an embodiment of the present invention.

FIG. 3 is a diagram illustrating the file structure of a sensitive code according to an embodiment of the present invention and FIG. 4 is a diagram illustrating the file structure of an obfuscated sensitive code according to an embodiment of the present invention.

Referring to the left one in FIG. 3, an export table includes the addresses of a plurality of sensitive codes (sensitive code A, sensitive code B, . . . ), and the addresses correspond to the sensitive codes (sensitive code A, sensitive code B, . . . ), respectively, which are stored in the type of a library in a native code section.

Next, the encoder 145 encrypts character strings (S245). That is, the encoder 145 can encrypt character strings by performing data obfuscation schemes such as a data storage conversion, data encoding conversion, and data ordering conversion on the character strings in the sensitive codes under a native environment.

The encoder 145 creates a sensitive code connector in a code type in the native code section, as in the right one in FIG. 3, and the sensitive code connector includes address information on native codes defined in the export table at the left one in FIG. 3.

The encoder 145 creates the address of the sensitive code connector, as in the right one in FIG. 3, by merging the addresses of the native codes defined in the export table at the left one in FIG. 3 (S250).

Accordingly, as in the right one in FIG. 3, address information illustrating the position of the sensitive code connector is stored in the export table.

Next, the controller 150 inserts a dummy code to the general code of the format of a java code (S255) and converts the sensitive method calling routine so that the sensitive method calling routine for calling sensitive codes calls dummy codes (S260). With the conversion for calling dummy codes, it is possible to prevent a static attack by a hacker and normal execution of performed through conversion for calling sensitive codes by the self modification scheme in execution of an application.

The controller 150 inserts a vector table generator for creating a vector table to a sensitive code (S270). The vector table is used to call sensitive codes when an application is loaded later on a client terminal.

Next, the controller 150 inserts the sensitive method calling routine converter to a sensitive code (S275). The sensitive method calling routine converter converts the sensitive method calling routines that call dummy codes in execution of an application call sensitive codes to that the application is executed normally.

Next, the first compiler 171 compiles the sensitive code added with the sensitive code connector, the vector table generator, and the sensitive method calling routine converter and the encoder 145 can encrypt a binary code by applying a code protection scheme based on self modification to the compiled sensitive code (S280).

FIG. 4 illustrates the structure of a sensitive code obfuscated through the process S280. As illustrated in FIG. 4, sensitive codes are encrypted with the sensitive code connector, the vector table generator, and the sensitive method calling routine converter and have a structure obtained by combining decoded routines.

The second compiler 172 creates an execution file by compiling a general code converted so that the sensitive method calling routine calls a dummy code through the process S260 (S290). As an embodiment of the present invention, the execution file is a file operating in a JVM or DVM, in detail, it is a DEX file.

The combiner 160 creates an obfuscated application in the format of a combined file by combining an encrypted general code and an encrypted sensitive code (S295). The application created by the combiner 160 is uploaded on an app store, an android market, and the like, and is later downloaded to client terminal connected through a network.

A process of executing an application by means of a client downloading the application is described with reference to FIGS. 5 to 7.

Figure 5:
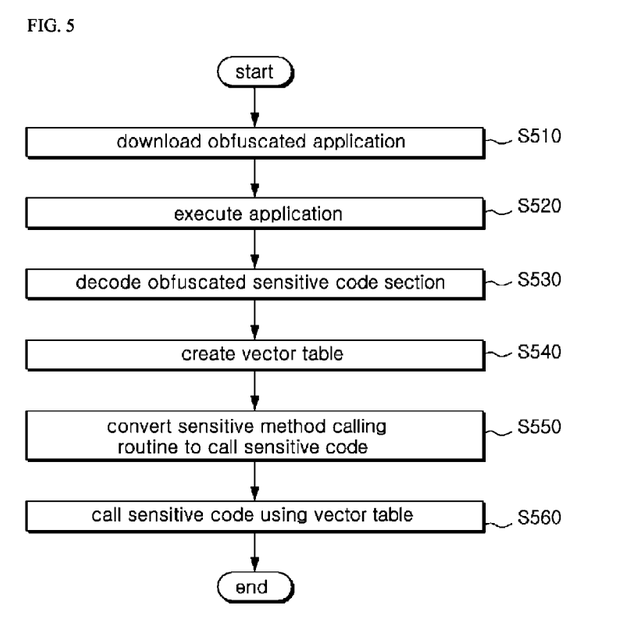
FIG. 5 is a flowchart illustrating a process of executing an application by means of a client terminal according to an embodiment of the present invention.
Figure 6A:
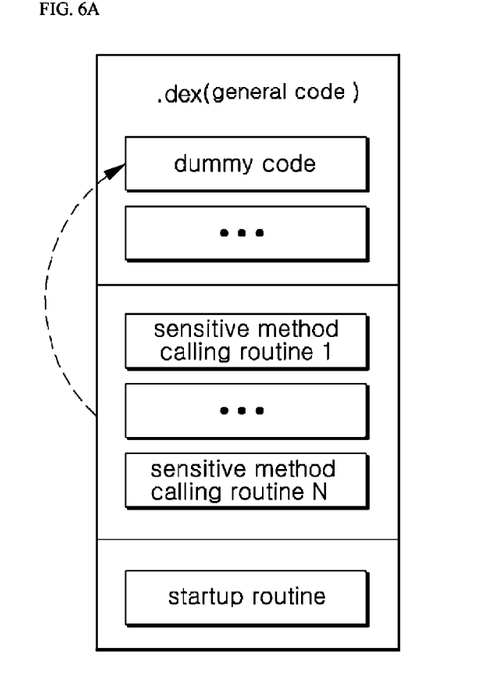
FIGS. 6A and 6B are diagrams illustrating a process of an obfuscated application by means of a client terminal according to an embodiment of the present invention.
Figure 6B:
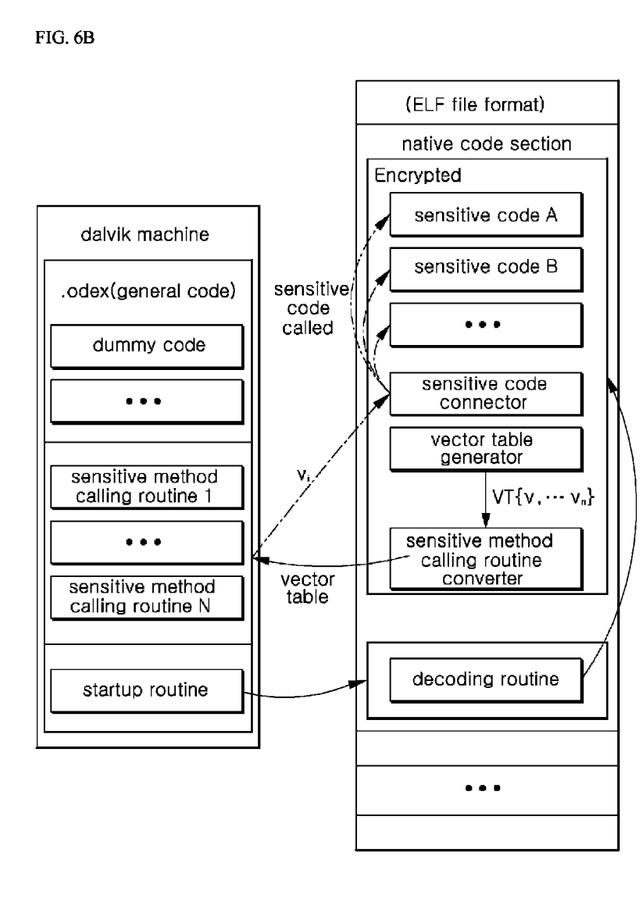
Figure 7:
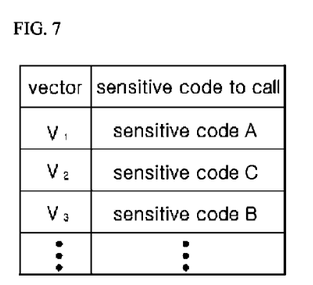
FIG. 7 is a diagram illustrating a vector table according to an embodiment of the present invention.

FIG. 5 is a flowchart illustrating a process of executing an application by means of a client terminal according to an embodiment of the present invention and FIGS. 6A and 6B are diagrams illustrating a process of an obfuscated application by means of a client terminal according to an embodiment of the present invention. FIG. 7 is a diagram illustrating a vector table according to an embodiment of the present invention.

A client terminal, first, downloads an obfuscated application through an android market or an app store (S510).

Then, the obfuscated application is installed to client terminal, the application is divided into a general code section that operations in a dalvik virtual machine and a sensitive code section of ELF that operates under the native environment.

The general code section has the structure illustrated in FIG. 6A. That is, the general code section is made in the format of the DEX file and includes a dummy code, a plurality of sensitive method calling routine, and a startup routine.

Further, as described above, the sensitive method calling routine is designed to call a dummy code to prevent static analysis by a hacker.

When a user executes the downloaded application (S520), the controller (not illustrated) of the client loads the general code onto a dalvik virtual machine (DVM), using the startup routine in the general code, as in FIG. 6B. The general code is not immediately executed in the format of the DEX file, but is converted into the format of an ODEX (Optimized DEX) file through DEX optimizing and then loaded on the dalvik virtual machine (DVM).

Through the optimizing, the sensitive code calling scheme using descriptor that is data composed of character strings in a DEX file is converted into a sensitive code calling scheme using an address of a data structure called a Vtable in an ODEX file.

When the user executes the downloaded application, the sensitive code is loaded on the memory region controlled by the CPU.

Then, the decoding routine in the sensitive code decodes the obfuscated sensitive code sections (sensitive code A, sensitive code B, . . . , sensitive code connector, vector table generator, sensitive method calling routine converter), using a self modification scheme of a native code (S530).

When the sensitive code sections are decoded, the vector table generator creates a vector table (S540). The vector table is a group of vector information connecting sensitive method calling routines and sensitive codes to be called, and dynamic vectors are matched with sensitive codes to be called, respectively, as in FIG. 7. In the vector table illustrated in FIG. 7, it is exemplified that the dynamic vector $V_1$ is matched with the sensitive code A, the dynamic vector $V_2$ is matched with the sensitive code C, the dynamic vector $V_3$ is matched with the sensitive code B.

Next, the sensitive method calling routine converter converts the sensitive method calling routine so that the sensitive method calling routine that has called dummy codes calls sensitive codes (S550). That is, the sensitive method calling routine converter changes the vector value of the sensitive method calling routines in accordance with the created vector table. For example, referring to FIG. 7, the vector values are changed in the same way of merged_V1 so that the sensitive method calling routine A_dummy that has called dummy codes before an application is executed can call the sensitive code A.

As described above, the reason that the sensitive method calling routine converter can convert the sensitive method calling routine that has called dummy codes is because the Vtable and address used when a sensitive code is called in an ODEX (Optimized DEX) file are converted into a Vtable and an address for a sensitive code from for a dummy code.

That is, the sensitive method calling routine converter is operated, it searches the sensitive method calling routines converted from ODES stacked in a memory, converts the Vtable and address for calling a dummy code into a Vtable and an address for calling a sensitive code through a self modification scheme, and changes vector values for calling too. The calling vectors that are used in the sensitive method calling routine decoded by the self modification scheme are determined by a vector table dynamically created, and the vector table is created by a generator configured in a native code. Accordingly, vector mapping changes for each execution and there is no need of a specific server for vector mapping, which provides an economic advantage.

Therefore, according to an embodiment of the present invention, the sensitive method calling routine that has called dummy codes before an application is executed is converted to call sensitive codes, by the Vtable in ODEX.

The sensitive method calling routine decoded as described above calls sensitive codes through the vector values in the vector table and the sensitive code connector calls sensitive codes to be mapped to the vector values sent as factors through the vector table (S560). That is, when the sensitive method calling routine calls the sensitive code A in the same way of the merged_V1, the sensitive code connector calls the sensitive code A corresponding to V1 with reference to the vector table.

As the conversion of the sensitive method calling routine by the sensitive method calling routine converter is finished, all the routines in the application can be normally executed.

As described above, according to an embodiment of the present invention, sensitive codes are stored in the format of the ELF and the structure of the sensitive code is not explicitly discriminated, such that they expose relatively less analysis information than the DEX format. Further, they are composed of CPU command at lower level than the dalvik command, such that they prevent analysis by a hacker. Further, a hacker feels more complicated in analysis due to the low-level CPU commands and unclear sensitive code structure, has to simultaneously analyze the codes that operate in a managed environment and a native environment of a dalvik virtual machine, and has to use an obfuscation scheme fitting each environment; and therefore, it is difficult to analyze the codes. Further, the sensitive method calling routine that calls sensitive codes is stored to call dummy codes when an application is not executed, and it is converted to actually call sensitive codes, using a self modification scheme when an application is executed, such that it prevents static and dynamic analysis by a hacker.

The present invention was described on the basis of embodiment. Those skilled in the art may understand that various modifications may be made without departing from the scope of the present invention. Accordingly, it should be noted that the examples are provided not to limit, but to explain the present disclosure. Accordingly, the present invention should be construed as including various embodiments within the claims and the equivalent range without being limited to the embodiments described above.

The invention claimed is:

1. An apparatus for tamper protection of an application code based on self modification, the apparatus comprising:
   an input unit that receives input codes to be used for an application;
   a code separator that separates the inputted codes into sensitive codes requiring application tamper protection and general codes including a sensitive method calling routine for calling the sensitive codes by analyzing the input codes;
   an encoder that encrypts the sensitive codes and inserts the address of a sensitive code connector storing the address information of the sensitive codes;
   a controller that converts the sensitive method calling routine to be able to call dummy codes by inserting the dummy codes to the general codes, inserts a vector table generator for creating a vector table including vector information of the sensitive codes, to the sensitive codes, and inserts a sensitive method calling routine converter, which makes the sensitive method calling routine to call the sensitive codes when the application is executed, to the sensitive codes; and
   a code combiner that creates the application by combining the general codes and the sensitive codes, wherein, the sensitive code connector, the vector table generator, the sensitive method calling routine converter, and the sensitive codes are decoded, the vector table generator creates the vector table, and the sensitive method calling routine converter converts the sensitive method calling routine to call the sensitive codes, and when the sensitive method calling routine calls the sensitive codes through a vector value in the vector table, the sensitive code connector calls and executes a sensitive code corresponding to the vector value via the vector table and the address information of the sensitive codes.

2. The apparatus of claim 1, further comprising:

a first compiler that complies the sensitive codes added with the sensitive code connector, the vector table generator, and the sensitive method calling routine converter under a native environment; and a second compiler that creates an execution file by compiling general codes converted so that the sensitive method calling routine calls dummy codes, under a managed environment.

3. The apparatus of claim 2, wherein the encoder encrypts a binary code by performing a code protection scheme based of self modification on the compiled sensitive codes.

4. The apparatus of claim 3, wherein a code converter adds a startup routine to be loaded with the sensitive codes to the general code.

5. The apparatus of claim 4, further comprising a scrambler that scrambles the sensitive codes and the general codes by replacing sensitive identifiers defined in the codes with meaningless characters or character strings.

6. The apparatus of claim 5, wherein when a client receiving the application executes the application, using the startup routine, the general code in the format of DEX file is converted into the format of an ODEX (Optimized DEX) file and loaded on a dalvik virtual machine.

7. A method of tamper protection of an application, using an apparatus for tamper protection of an application, the method comprising:

receiving input codes to be used for an application;

separating the inputted codes into sensitive codes requiring application tamper protection and general codes including a sensitive method calling routine for calling the sensitive codes by analyzing the input codes;

encrypting the sensitive codes and inserting the address of a sensitive code connector storing the address information of the sensitive codes;

converting the sensitive method calling routine to be able to call dummy codes by inserting the dummy codes to the general codes and inserting a vector table generator for creating a vector table including vector information of the sensitive codes, to the sensitive codes;

inserting a sensitive method calling routine converter, which makes the sensitive method calling routine call the sensitive codes when the application is executed, to the sensitive codes;

creating the application by combining the general codes and the sensitive codes;

performing a startup routine when a client receiving the application executes the application;

decoding the encrypted sensitive code connector, the vector table generator, the sensitive method calling routine converter, and the sensitive codes;

creating the vector table by the vector table generator; and converting the sensitive method calling routine to call the sensitive codes by the sensitive method calling routine converter, wherein when the sensitive method calling routine calls the sensitive codes through a vector value in the vector table, the sensitive code connector calls and executes a sensitive code corresponding to the vector value via the vector table and the address information of the sensitive codes.

8. The method of claim 7, further comprising:

compiling the sensitive codes added with the sensitive code connector, the vector table generator, and the sensitive method calling routine converter under a native environment; and creating an execution file by compiling general codes converted so that the sensitive method calling routine calls dummy codes, under a managed environment.

9. The method of claim 8, wherein an encoder encrypts a binary code by performing a code protection scheme based of self modification on the compiled sensitive codes.

10. The method of claim 9, wherein a general code in the format of DEX file is converted into the format of an ODEX (Optimized DEX) file and loaded on a dalvik virtual machine (DVM).

* * * * *